(12) United States Patent
Ohtani

(10) Patent No.: US 6,511,600 B1
(45) Date of Patent: Jan. 28, 2003

(54) MICROFILTER CARTRIDGE

(75) Inventor: Sumio Ohtani, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/585,469

(22) Filed: Jun. 2, 2000

(30) Foreign Application Priority Data

| Jun. 3, 1999 | (JP) | 11-156798 |
| Aug. 4, 1999 | (JP) | 11-221476 |
| Dec. 10, 1999 | (JP) | 11-351839 |
| Dec. 10, 1999 | (JP) | 11-351840 |
| Mar. 2, 2000 | (JP) | 2000-057330 |

(51) Int. Cl.⁷ .......................... B01D 27/06; B01D 71/68
(52) U.S. Cl. ............... 210/500.41; 210/493.2; 210/493.5
(58) Field of Search .................. 210/493.1, 493.5, 210/497.01, 321.6, 500.41, 490, 496, 493.2; 429/94; 264/425

(56) References Cited

U.S. PATENT DOCUMENTS

| 3,686,381 A | * | 8/1972 | Fairbanks |
| 4,871,456 A | * | 10/1989 | Naruo et al. |
| 4,906,371 A | * | 3/1990 | Miller |
| 4,929,354 A | * | 5/1990 | Meyering et al. |
| 4,956,089 A | * | 9/1990 | Hurst |
| 4,959,150 A | * | 9/1990 | Degen |
| 4,964,992 A | * | 10/1990 | Goldsmith et al. |
| 5,376,278 A | * | 12/1994 | Salem |
| 5,846,421 A | * | 12/1998 | Ohtani |
| 5,988,400 A | * | 11/1999 | Karachevtcev et al. |
| 6,110,368 A | * | 8/2000 | Hopkins et al. |

FOREIGN PATENT DOCUMENTS

| DE | 43 39 810 C1 | | 12/1994 |
| JP | 62-121603 | * | 6/1987 |
| JP | 63-139930 | * | 6/1988 |
| JP | 4-200728 | | 7/1992 |
| JP | 4-235722 | | 8/1992 |
| JP | 5-111622 | | 5/1993 |
| JP | 10-66842 | | 3/1998 |
| JP | 10-71327 | | 3/1998 |

OTHER PUBLICATIONS

Patent Abstract of Japan (JP 4–200728).
Patent Abstract of Japan (JP 4–235722).
Patent Abstract of Japan (JP 10–66842).
Patent Abstract of Japan (10–71327).
XP–002147188 (Abstract of JP 5–111622) Patent Abstract of Japan (JP 5–111622).
XP–002147186 (Abstract of JP 4–200728).
XP–002147186 (Chemical Abstracts 132: 115803).
XP–002147190 (Abstract of JP 10–66842).
XP–002147191 (Abstract of JP 4–235722).
XP–002147189 (Abstract of JP 10–71327).
XS 0011103010 MA (Abstract).
European Search Report.
XP–002147187 (Abstract of JP 4–200728).

* cited by examiner

*Primary Examiner*—Ana Fortuna
(74) *Attorney, Agent, or Firm*—Sughrue Mion, PLLC

(57) ABSTRACT

The object of the present invention is to provide a cartridge filter with the use of a hydrophilic microporous filter membrane excellent in chemical resistance which is appropriately usable in, for example, processes for producing semiconductors and drugs. A microfilter cartridge is described wherein a microporous filter membrane, membrane supports, a core, an outer cover and end-plates constituting the filter cartridge are all made of a polysulfone polymer.

3 Claims, 2 Drawing Sheets

(a)

9

(b)

9

MICROFILTER CARTRIDGE

FIELD OF THE INVENTION

This invention relates to a cartridge filter with the use of a microporous filter membrane. More particularly, it relates to a cartridge filter with the use of a hydrophilic microporous filter membrane having a high chemical resistance which is appropriately usable in processes for producing, for example, semiconductors and drugs.

BACKGROUND OF THE INVENTION

In the production of semiconductors, there have been recently required filters which are highly resistant to liquid chemical agents such as organic solvents, acids, alkalis and oxidizing agents and provide little eluate. It is a present-day practice to use, in filtering these liquid chemical agents, filters consisting of microporous microfilter membranes made of polytetrafluoroethylene (PTFE) and other filter-constituting members made of fluoropolymers.

However, PTFE filter membranes suffer from a problem that since they have a highly hydrophobic nature, they would undergo air-rock even upon contamination with only a very small amount of bubbles thereby making filtration impossible, even though they have been moistened with isopropanol at the initiation of the filtration. When these fluoropolymer filters are disposed after using, there arises another problem that toxic gases are generated by incineration.

SUMMARY OF THE INVENTION

Under these circumstances, an object of the invention is to provide a filter cartridge which withstands the filtration of acids, alkalis, oxidizing agents, alcohols, in particular, a liquid mixture of hydrochloric acid with an aqueous solution of hydrogen peroxide (i.e., so-called HPM) and isopropanol at a high temperature (60 to 80° C.), as frequently used in processes of producing semiconductors and drugs, and the filters of which can be easily disposed by incineration after using.

The object of the invention has been achieved by the following aspects of the invention.

(1) A microfilter cartridge wherein a microporous filter membrane, membrane supports, a core, an outer cover and end-plates constituting the filter cartridge are all made of a polysulfone polymer.

(2) The microfilter cartridge as described in (1), wherein the polysulfone polymer is polyether sulfone.

(3) The microfilter cartridge as described in (1), wherein the membrane supports are microporous membranes provided with a number of fine grooves and/or projections.

(4) The microfilter cartridge as described in (3), wherein the microporous filter membrane has a water bubble point of 0.3 MPa or more while the membrane supports have a water bubble point of 0.15 MPa or less.

(5) The microfilter cartridge as described in (1), wherein the membrane supports are polysulfone polymer films having been physically perforated and provided with a number of fine grooves and/or projections.

(6) The microfilter cartridge as described in (1), wherein the membrane supports are polysulfone polymer films provided with a number of fine grooves and/or projections and these fine grooves form together continuous fine grooves.

(7) The microfilter cartridge as described in (1), wherein the membrane supports are made of a net formed by knitting polysulfone monofilaments having a diameter of from 50 to 300 μm.

Figure 1:
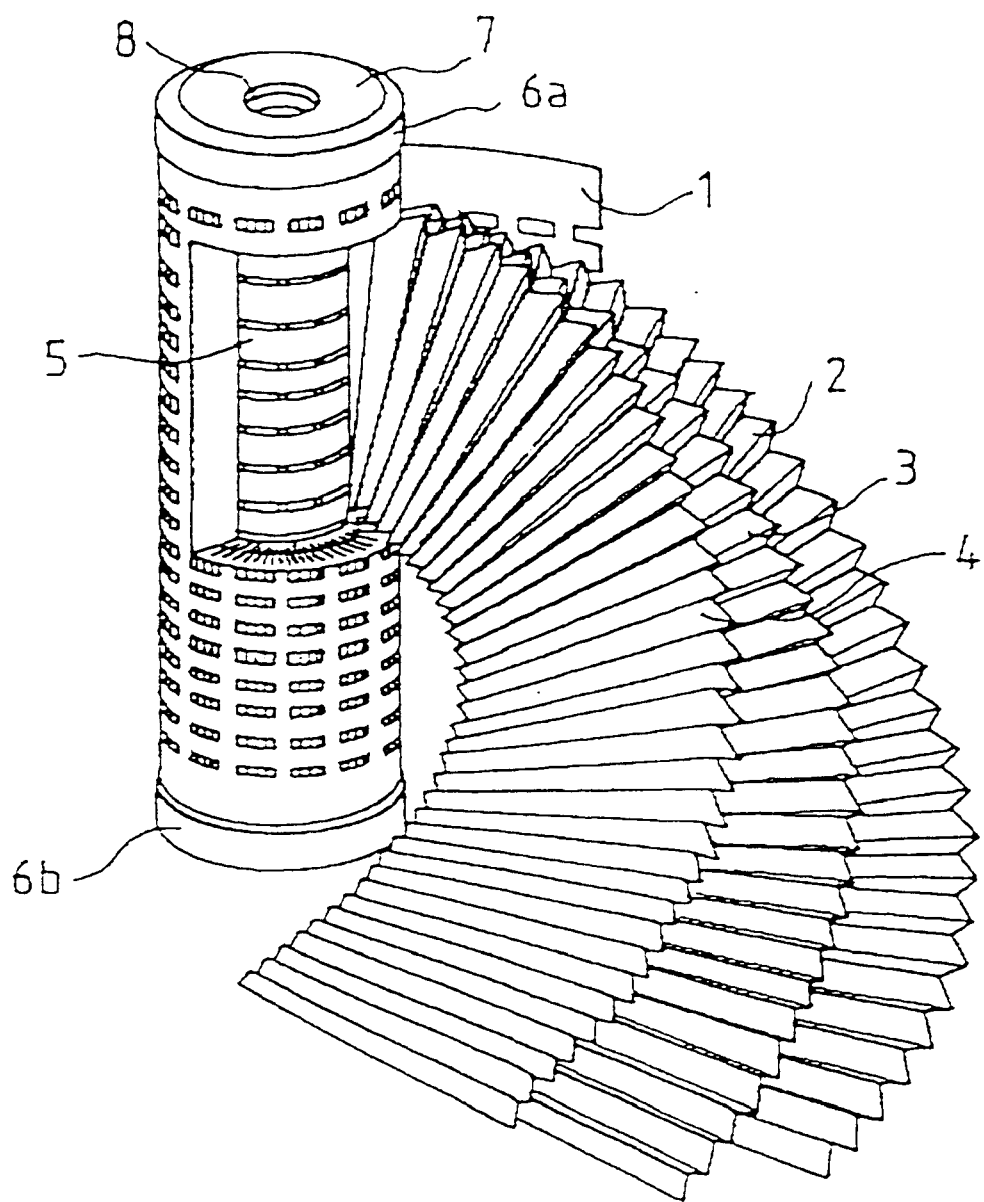
FIG. 1 illustrates a development of the whole structure of a pleated filter cartridge commonly employed.

The simbols in FIGS. 1 and 2 will hereinafter be explained.

1: outer covering
2: upstream membrane support
3: microfilter membrane
4: downstream membrane support
5: core
6a, 6b: end-plates
7: gasket
8: fluid outlet
9: film.

DETAILED DESCRIPTION OF THE INVENTION

Known filter cartridges are generally classified into pleated cartridges formed by laying a filter membrane on membrane supports for protecting the membrane and then pleating the same, and flat laminate cartridges formed by laminating plural filtration units each in the form of a flat sheet. The structure of the pleated cartridges is described in, for example, JP-A-4-235722 and JP-A-10-66842, while the structure of the flat laminate cartridges is described in, for example, JP-A-63-80815, JP-A-56-129016 and JP-A-58-98111 (the term "JP-A" as used herein means an "unexamined published Japanese patent application") Although filter cartridges of either type are usable in achieving the object of the invention, pleated cartridges are particularly useful therefor.

Now, the structure will be described in greater detail by reference to a pleated filter cartridge by way of example.

FIG. 1 illustrates a development of the whole structure of a pleated microfilter membrane cartridge filter commonly employed.

In the pleated filter cartridge as shown in FIG. 1, a microfilter membrane 3 is pleated in a state of being sandwiched between two membrane supports 2 and 4 and wound around a core 5 provided a number of collection ports. An outer covering 1 is provided outside to protect the microfilter membrane 3. The microfilter membrane 3 is sealed at both ends of the cylinder with end-plates 6a and 6b. Each end-plate is contacted with a sealing part of a filter housing (not shown) via a gasket 7. In some cases, one of the end-plates is provided with an O-ring through which it comes in contact with a filter housing. Since the gasket or O-ring can be easily removed at disposal, it is not essentially required that these members are also made of a polysulfone material. The filtered liquid is collected at the collection ports of the core and, via the hollow part of the cylinder, discharged from a fluid outlet 8 located at the end of the cylinder. In some cases, two fluid outlets are provided at both ends of the cylinder, while one fluid outlet is provided at one end in others.

In such a pleated filter cartridge, it is also possible, if necessary, to pass the liquid to be filtered and the filtrate each in the direction opposite to the one described above. Namely, the liquid to be filtered is supplied from the fluid outlet 8 into the filter cartridge and filtered through the microporous filter membrane 3, while the filtrate is discharged outside the filter cartridge.

As the microfilter membrane 3, it is preferable to use a membrane made of a non-halogen polymer, for example, a polyether sulfone such as an aromatic polyaryl ether sulfone, a polyolefin or a polyamide. Among all, it is preferable to use a hydrophilic membrane made of an aromatic polyaryl ether sulfone (hereinafter referred to as a "polysulfone polymer") because of the excellent heat resistance and chemical resistance thereof.

Chemical formulae (1) to (3) show typical chemical structures of polysulfone polymers to be used in the invention. The polymer represented by the chemical formula (1) has been marketed from Amoco Co. under the trade name UDEL POLYSULFONE. The polyether sulfone represented by the chemical formula (2) has been marketed from Sumitomo Chemical Co., Ltd. under the trade name SUMIKAEXCEL PES.

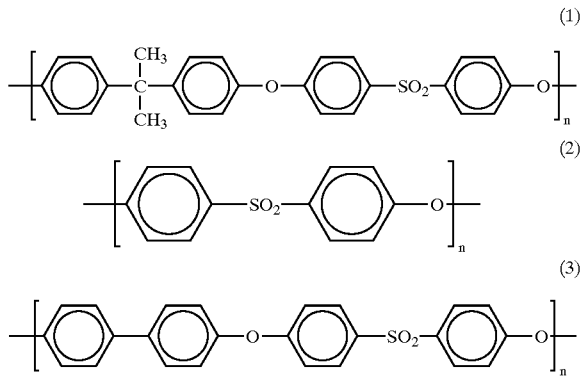

The microporous filter membrane to be used in the microfilter cartridge of the invention can be produced by selecting and employing an appropriate process from among the conventional processes for producing microporous filter membranes with the use of polysulfone polymers.

Processes for producing hydrophilic microporous filter membranes made of polysulfone polymers are described in detail in, for example, JP-A-56-154051, JP-A-56-86941, JP-A-56-12640, JP-A-62-27006, JP-A-62-258707 and JP-A-63-141610.

Since there are marketed a number of microporous filter membranes made of polysulfone polymers, it is also possible to select and employ an appropriate marketed product therefor.

The pore size of microporous filter membrane to be used in the invention generally ranges from 0.02 to 5 $\mu$m. In case of using in the production of semiconductors, it is preferable to use a filter membrane having a pore size of 0.02 to 0.45 $\mu$m. In case of using in the production of high-integrated ICs, it is particularly preferable to use a filter membrane having a pore size of from 0.02 to 0.2 $\mu$m. This membrane characteristic corresponds to a water bubble point value, measured in accordance with ASTM F316, of 0.3 MPa or more and an ethanol bubble point of 0.1 to 1 MPa. It is still preferable that the filter membrane has an ethanol bubble point of from 0.3 to 0.7 MPa.

It is preferable that a membrane has a high porosity based on the apparent volume, since the filtration resistance can be reduced thereby. However, an excessively high porosity worsens the membrane strength thereby making the membrane brittle. Therefore, it is preferable to use a membrane having a void ratio of from 40 to 90%, still preferably from 57 to 85%.

The thickness of a membrane usually ranges from 30 to 220 $\mu$m. When the membrane is too thick, the membrane can be packed into the cartridge only in a small area. When the membrane is too thin, on the other hand, the membrane strength is worsened. It is, therefore, preferable that the membrane thickness ranges from 60 to 160 $\mu$m, still preferably from 90 to 140 $\mu$m.

The microfilter membrane 3 is sandwiched between the membrane supports 2 and 4 and then pleated by a publicly known method.

In the conventional pleated cartridges, it has been a practice to use, for example, nonwoven fabrics, woven fabrics, nets or microporous membranes as the upstream membrane support 2 and the downstream membrane support 4. These membrane supports are employed to strengthen the filter membrane against changes in filtration pressure, to allow the liquid to permeate from the liquid supply side to the filtration side, and, at the same time, to introduce the liquid into the inner parts of pleats in the direction parallel to the filter membrane. Accordingly, it is necessary that these membrane supports have an adequate liquid-permeability and a sufficient physical strength for protecting the filter membrane. Although any sheet material is usable therefor so long as it satisfies these requirements, there have been employed in most cases polyester or polypropylene nonwoven fabrics which are less expensive and excellent in performance.

The membrane supports usable in the invention should have a heat resistance and a chemical resistance and be incineratable, in addition to the general functions as described above. Thus, the inventors have conducted intensive studies and, as a result, found out that it is preferable for achieving the object as described above to use non-halogen polymers which are comparable or even superior in heat resistance and chemical resistance to the material employed for the microporous filter membrane 3, in particular, polysulfone polymers being excellent both in heat resistance and chemical resistance. However, it is impossible to use nonwoven or woven fabrics made of polysulfone polymers, since no polysulfone polymer fiber is available.

In the microfilter cartridge filter according to the invention, therefore, use is made of a microporous filter membrane made of a polysulfone polymer as the membrane supports. These membrane supports are produced fundamentally in the same manner as in the production of the microporous microfilter membrane as described above. The microporous membrane to be used as the membrane supports generally has a water bubble point of 0.15 MPa or less, preferably from 0.02 to 0.15 MPa and still preferably from 0.04 to 0.15 MPa. It is preferable that the water permeability in the direction perpendicular to the membrane support face is 150 ml/cm² or more, more preferably 200 ml/cm² or more, when expressed in the water flow per minute under loading a differential pressure of 0.1 MPa. The Mullen bursting strength of the membrane supports is preferably 80 kPa or more, still preferably 120 kPa or more.

Grooves and/or projections may be formed on the membrane supports to be used in the invention by an arbitrary method without restriction. This object can be achieved by using an embossing calender wherein a microporous membrane is sandwiched between a metal roll provided with a number of projections and a back-up roll having a smooth surface and continuously pressed. Grooves are exclusively formed on a membrane support in case of using a hard back-up roll, while projections are simultaneously formed on the opposite face of the grooves in case of using a flexible back-up roll. Since pores are squashed and thus the water permeability disappears in the grooves, it is favorable that these grooves are formed within an area not more than a half of the whole support membrane.

In this case, the grooves and/or projections may be formed either on one face or both faces of the membrane support. The depth/height of the grooves/projections to be formed on the membrane support can range from 5 μm to 0.25 mm, preferably from 20 μm to 0.15 mm and still preferably from 50 μm to 0.1 mm. The width of the grooves and/or projections (hereinafter referred to simply as grooves) to be formed on the membrane support can range from 5 μm to 1 mm, preferably from 20 μm to 0.4 mm and still preferably from 50 μm to 0.2 mm. It is not necessary that the width and depth of the grooves are uniform anywhere. In case of forming grooves, it is not preferable to form round or polyhedral grooves independent from each other. Namely, it is preferable to form grooves connected to each other so as to allow a liquid to flow in the face direction. It is further preferable that a number of grooves are formed lengthwise and crosswise and intersect each other. It is preferable that intervals among grooves are 4 mm at the broadest, still preferably from 0.15 to 2 mm.

The thickness of the microporous membrane to be used as the membrane supports preferably ranges from 60 to 300 μm, still preferably from 100 to 220 μm. When the microporous filter membrane is too thin, it can achieve only a poor effect of reinforcing the filter membrane. On the other hand, it is also unfavorable that the microporous filter membrane is too thick, since the area of the membrane which can be packed in the cartridge is lessen in this case.

It is possible in the invention to use membrane supports which are polysulfone polymer films provided with a number of grooves and/or projections and, further, having been physically perforated. The film may be perforated by an arbitrary method without restriction, for example, the punching method, the needle-piercing method, the laser-burning off method or the water jet-blanking method. Regarding the pore size, use may be made of circular, ellipsoidal or rectangular pores of 10 μm to 5 mm in diameter or one side. The pore size preferably ranges from 30 μm to 1.5 mm, still preferably from 60 μm to 0.5 mm. The ratio of the pore area may amount to 10 to 90% of the whole membrane support area. When the pore area ratio is too small, the filtration resistance is excessively enlarged. When the pore area ratio is too large, on the other hand, the mechanical strength is worsened and thus the membrane supports fails to reinforce the microporous filter membrane. In case of forming large pores, a large pore area ratio is needed. In case of forming small pores, the pore area ratio may be relatively small.

In this case, the depth (height) of the grooves and/or projections formed on the film may range from 5 μm to 1 mm, preferably from 20 μm to 0.4 mm and still preferably from 50 μm to 0.2 mm. It is not necessary that the width and depth of the grooves are uniform anywhere. It is not preferable to form round or polyhedral grooves independent from each other on the film. Namely, it is necessary to form grooves connected to each other so as to allow a liquid to flow in the face direction. It is further preferable that a number of grooves are formed lengthwise and crosswise and intersect each other. The groove width preferably ranges from 5 to 1000 μm, still preferably from 20 to 400 μm and particularly preferably from 50 to 200 μm. It is preferable that intervals among grooves are 4 mm at the broadest, still preferably from 0.15 to 2 mm.

The thickness of the film to be used as the membrane supports preferably ranges from 25 to 125 μm and still preferably from 50 to 100 μm. When the film is too thin, it has only a poor effect of reinforcing the filter membrane. When it is too thick, on the other hand, pleating can be hardly performed.

It is particularly preferable in the membrane supports of the invention that the grooves are connected to all pores having been formed preliminarily. The projected pattern formed on the opposite face to the grooved face in association with the formation of the grooves may be essentially either connected to each other or independent. However, continuous projections are preferable. This is because, in the case of embossing, the grooves and projections are located on the front and back faces respectively. Thus, independent projects formed on one face correspond to discontinuous and independent grooves formed on the opposite face.

Figure 2:
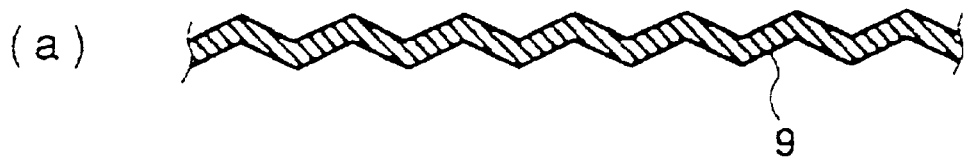
FIG. 2 schematically shows the sections with uneven shape of films constituting membrane supports.
Figure 2:
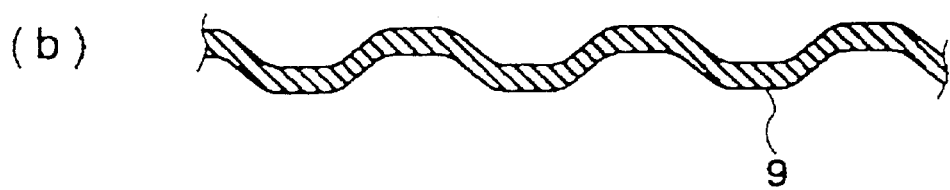

As FIGS. 2(a) and 2(b) schematically show, the cross section of the film may be in various shapes. In FIG. 2, 9 stands for a film and physical pores formed on the film are omitted.

The third membrane support material useable herein is a net. The net can be obtained by spinning and knitting monofilaments of 50 to 300 μm in diameter. These monofilaments used in the net can be relatively easily spun, since they are thick and superior in strength to yarns for forming non-woven fabrics. Filaments having a smaller diameter can give a thinner net which can be easily pleated. On the other hand, filaments having a smaller diameter make spinning the more difficult and cause a decrease in the strength of the net obtained therefrom. By taking these factor into consideration, the filament size preferably ranges from 100 to 200 μm.

The microporous filter membrane is sandwiched between the membrane supports and then subjected to pleating in a conventional manner. Either one or more microporous filter membranes may be employed. Either one or more membrane supports may be used in each side.

After pleating, both ends of the pleated filter material are made uniform by cutting off unnecessary parts with, for example, a cutter knife and rolled to form a cylinder. Then the pleats at the joint are liquid-tightly sealed by heat-sealing or with the use of an adhesive. The six layers (i.e., the microporous filter membrane and the membrane supports) may be all sealed together. Alternatively, both ends of the filter membrane, excluding the support 2 or 4, may be overlapped together and sealed. It is also possible that a polysulfone sheet is inserted into the joint and heat-sealed. To achieve good adhesion, it is preferable that the adhesive or the polysulfone sheet to be used herein is made of the same material as the filter membrane. In case of using an adhesive, a polysulfone polymer is used in a state of being dissolved in a solvent. For example, 10 parts of polyether sulfone is dissolved in a liquid mixture of 30 parts of methylene chloride and 20 parts of diethylene glycol and then 140 parts of diethylene glycol is slowly added thereto and mixed. The solvent is not left on the filter cartridge but evaporated off by heating after adhesion.

Next, the core 5 is inserted into the cylindrical filter material thus obtained and the outer covering 1 is provided around the filter to give a pleated matter. Methods usable in the step of heat-sealing wherein both ends of the pleated matter are closely sealed to the end-plates 6 are roughly classified into the hot-melt method and the solvent adhesion method. In the hot-melt method, the sealing face of each end-plate is exclusively contacted with a hot plate or irradiated with an infrared heater so that the surface thereof alone is molten. Then one end face of the pleated matter is pressed to the molten face of the end-plate and thus adhesion-sealed.

In the solvent adhesion method, it is important to select an adequate solvent. It is recommended that about 1 to 7% by weight of a polymer has been preliminarily dissolved in the solvent adhesive. As the polymer to be dissolved, use is made of the same one as used in the end-plates or, at least, one which can be easily adhered to the end-plates.

The materials to be used in the membrane supports 2 and 4, the core 5, the outer covering 1 and the end-plates 6 should also have a heat resistance and a chemical resistance. It is also necessary that these materials are incineratable. It is therefore preferable that these materials are selected from among non-halogen polymer materials such as polysulfone polymers, polyolefins and amides. Among all, polysulfone polymers are preferable and polyether sulfone is still preferable because of being excellent in heat resistance and chemical resistance and relatively less expensive. It is not always necessary that these members are made of the same material, so long as these materials can be adhered to each other. However, it is still preferable that these members are made of the same material, since excellent adhesion can be established in such a case. It is particularly preferable that all of these members are made of polyether sulfone from the viewpoint of broadening the chemical resistance and achieving good adhesion sealing.

The microfilter cartridge according to the invention is resistant to acids, alkalis, oxidizing agents and alcohols at high temperature. After using, the filter cartridge can be easily incinerated.

The invention will be described in greater detail by reference to the following Examples, but it should be understood that the invention is not construed as being limited thereto.

EXAMPLE 1

A polysulfone membrane having an ethanol bubble point of 250 kPa was formed by the method described in Example 1 of JP-A-63-139930 and employed as a microporous filter membrane (hereinafter referred to as the membrane A). On the other hand, another polysulfone membrane having an ethanol bubble point of 50 kPa was formed by the method described in Example 3 of JP-A-63-139930 (hereinafter referred to as the membrane B). On one face of the membrane B, grooves (width: about 0.15 mm, depth: about 55 $\mu$m) were formed at intervals of 0.15 to 0.3 mm by emboss calendering. The membrane C thus obtained was employed as a membrane support.

The membrane A was sandwiched between two membranes C and pleated in a conventional manner. The membranes C in the upstream and the downstream were each contacted with the membrane A in the smooth face having no grooves. The bundled membranes having been pleated about 120 times (pleat intervals: 10.5 mm, membrane width: 240 mm) were cut and shaped into a cylinder. Then the pleats at the joint were liquid-tightly sealed by heat-sealing. The bundled membranes and the core were packed in a polysulfone outer covering and both ends were combined together to form a pleated matter. The surface of an end-plate formed by cutting a polysulfone round bar was irradiated with infrared light and thus molten at about 350° C. Then an end of the pleated matter, which had been sufficiently pre-heated, was pressed against the end-plate surface and thus adhesion-sealed. Another end of the pleated matter was also sealed to an end-plate in a molten state, thereby completing the construction of a filter cartridge.

EXAMPLE 2

A filter cartridge was constructed as in Example 1 but using the membranes B as in Example 1 as the upstream and downstream membrane supports without emboss calendering.

EXAMPLE 3

A polyether sulfone film of 50 $\mu$m in thickness (SUMILITE FS-1300, manufactured by Sumitomo Bakelite Co., Ltd.) was punched to give 3 pores (diameter: 0.6 mm) per 2 cm×2 cm. By using a flexible resin roll as a back roll, the punched film was emboss calendered to thereby give grooves (width: about 0.2 mm) at intervals of about 0.2 mm. In this step, the surface temperature of the emboss roll was 125° C. and the pressing force was 100 kN/m.

A polyether sulfone microporous filter membrane of 0.1 $\mu$m in pore size (MICRO PES 1FPH, manufactured by Membrana, ethanol bubble point value: 340 kPa) was sandwiched between two membranes formed above followed by pleating. After pleating about 140 times (pleat intervals: 10.5 mm, membrane width: 240 mm), the bundled membranes were cut and shaped into a cylinder. Then the pleats at the joint were liquid-tightly sealed by heat-sealing. A pleated matter was constructed and sealed to end-plates in a molten state as in Example 1 to give a filter cartridge.

EXAMPLE 4

Filaments of 200 $\mu$m in diameter were spun from polyether sulfone pellets (SUMIKAEXCEL PES3600G) and then twill-woven to give a net. A filter cartridge consisting of bundled and pleated membranes (about 120 pleats) was constructed as in Example 1 but using the net obtained above as the downstream support, the same polyether sulfone membrane as in Example 2 as the microporous filter membrane, and the same polyether sulfone film having been punched and emboss calendered as in Example 2 as the upstream support.

COMPARATIVE EXAMPLE 1

A filter cartridge consisting of bundled and pleated membranes (about 140 pleats) was constructed by using the membrane A as in Example 1 as the microporous filter membrane, polypropylene non-woven fabric membranes (SYNTEX PS-160, manufactured by Mitsui Petrochemical Industries, Ltd., fiber size: 2 D, basis weight: 30 g/m$^2$) as the upstream and downstream supports, and molded polypropylene articles as the core, the outer covering and the end-plates.

(1) Evaluation of chemical resistance

The filter cartridges of Examples 1 to 4 and Comparative Example 1 were compared and evaluated in chemical resistance. Table 1 shows the results. As a result, polypropylene was seriously deteriorated when immersed in HPM, whereas polysulfone and polyether sulfone were scarcely deteriorated. In the filter cartridge of Comparative Example 1, the polysulfone membrane could not be supported by the membrane supports any longer and suffered from cracking at the parts close to the molded adhesion sites to the end-plates, thereby failing to maintain the integrity.

The chemicals employed were HPM and isopropanol. Each filter cartridge was immersed in each chemical and heated to 80° C. for 8 hours per day, 480 hours in total. Next, the maintenance of the integrity and appearance of the filter cartridge were observed. HPM was prepared by mixing conc. hydrochloric acid, a 30% aqueous solution of hydrogen peroxide and ultrarpure water at a ratio of 1:1:1. Since HPM would be deteriorated, it was replaced by a fresh one everyday.

TABLE 1

| Chemical | Evaluation item | Ex. 1 | Ex. 2 | Ex. 3 | Ex. 4 | C. Ex. 1 |
|---|---|---|---|---|---|---|
| HPM | Maintenance of integrity | pass | pass | pass | pass | rejected |
| | Appearance | No difference from untreated product. | | | | Membrane supports were deteriorated and fell-off in pieces. End-plates, core and outer covering suffered from serious cracking and color change. |
| Iso-propanol | Maintenance of integrity | pass | pass | pass | pass | rejected |
| | Appearance | No difference from untreated product. | | | | Fine marks were formed on the surface of end-plates, core and outer covering. |

(2) Evaluation of Flow Characteristics and Pressure Resistance

Table 2 shows the results of the evaluation of the flow characteristics and pressure resistances of the filter cartridges of Examples 1 to 4. The filter cartridges of Examples 1, 3 and 4 are excellent both in the flow characteristics and pressure resistance. In contrast, the filter cartridge of Example 2 with the use of the membrane supports not emboss-calendered is much inferior in flow characteristics.

Flow characteristics were evaluated by feeding water with a pump at a flow rate of 2 kl/min into a filter cartridge packaged in a filtering unit and the filtration differential pressure was measured. Pressure resistance was evaluated by supplying and discharging compressed air of 100 kPa alternately from the upstream and the downstream of the filter cartridge, which had been moistened with water so as to prevent air to permeate therethrough, repeatedly 3000 and 5000 times. Then the maintenance of the integrity was measured and the occurrence of the filter breakage was evaluated. The maintenance of the integrity was judged by applying an air pressure of 200 kPa to the upstream of the filter cartridge, then blocking the supply of the compressed air and examining the occurrence of a decrease in the air pressure over 3 minutes while allowing the filter cartridge to stand during this period.

TABLE 2

| | | Ex. 1 | Ex. 2 | Ex. 3 | Ex. 4 | C. Ex. 1 |
|---|---|---|---|---|---|---|
| Filtration differential pressure (kpa) | | 75 | 350 | 65 | 70 | 60 |
| Maintenance of integrity | 3000 | pass | pass | pass | pass | pass |
| | 5000 | rejected | rejected | rejected | rejected | rejected |

(3) Mullen Bursting Strength Test

After completing the immersion in HPM for evaluating the chemical resistance as described in the above (1), the microporous filter membranes of Examples 1 and 3 were taken out and subjected to a Mullen bursting strength test. The polysulfone membrane of Example 1 showed a Mullen bursting strength of 95 kPa, thereby showing a slight decrease compared with the non-immersed polysulfone membrane (110 kPa). The polyether sulfone membrane of Example 3 showed a Mullen bursting strength of 120 kPa, thereby showing no difference from the non-immersed polyether sulfone membrane (120 kPa).

While the invention has been described in detail and with reference to specific embodiments thereof, it will be apparent to one skilled in the art that various changes and modifications can be made therein without departing from the spirit and scope thereof.

What is claimed is:

1. A microfilter cartridge comprising a microporous filter membrane, membrane supports, a core, an outer cover and end-plates, each of which comprises a polysulfone polymer, wherein said membrane supports are microporous membranes provided with a number of fine grooves and/or projections, and wherein said microporous filter membrane has a water bubble point of 0.3 MPa or more while said membrane supports have a water bubble point of 0.15 MPa or less.

2. A microfilter cartridge comprising a microporous filter membrane, membrane supports, a core, an outer cover and end-plates, each of which comprises a polysulfone polymer, wherein said membrane supports are made of a net formed by knitting polysulfone monofilaments having a diameter of from 50 to 300 $\mu$m.

3. A microfilter cartridge comprising a microporous filter membrane, membrane supports, a core, an outer cover and end-plates, each of which comprises a polyether sulfone polymer, wherein said membrane supports are made of a net formed by knitting polyether sulfone monofilaments having a diameter of from 50 to 300 $\mu$m.

* * * * *